(12) United States Patent
Torrents I Comas

(10) Patent No.: US 8,475,091 B2
(45) Date of Patent: Jul. 2, 2013

(54) DRILL GUIDE

(75) Inventor: Josep Torrents I Comas, Barcelona (ES)

(73) Assignee: Germans Boada, S.A. (ES)

( * ) Notice: Subject to any disclaimer, the term of this patent is extended or adjusted under 35 U.S.C. 154(b) by 1012 days.

(21) Appl. No.: 12/428,796

(22) Filed: Apr. 23, 2009

(65) Prior Publication Data

US 2010/0232897 A1    Sep. 16, 2010

(30) Foreign Application Priority Data

Mar. 12, 2009    (ES) ................. 200900486 U

(51) Int. Cl.
*B23B 47/28*    (2006.01)

(52) U.S. Cl.
USPC .............. 408/115 R; 408/56; 408/115 B

(58) Field of Classification Search
USPC ............. 408/56, 115 R, 115 B, 72 B, 241 B
IPC ....................................... B23B 47/28
See application file for complete search history.

(56) References Cited

U.S. PATENT DOCUMENTS

| | | | | |
|---|---|---|---|---|
| 2,552,463 A | * | 5/1951 | Searles | 408/56 |
| 2,810,310 A | * | 10/1957 | Saunders | 408/109 |
| 3,062,076 A | * | 11/1962 | Craig | 408/105 |
| 3,097,891 A | * | 7/1963 | Brideau | 384/31 |
| 3,108,500 A | * | 10/1963 | Merriman | 408/241 R |
| 3,874,808 A | * | 4/1975 | Zaccardelli et al. | 408/1 R |
| 4,194,861 A | * | 3/1980 | Keller | 408/109 |
| 7,290,963 B2 | * | 11/2007 | Hechtle et al. | 408/76 |
| 7,896,587 B1 | * | 3/2011 | Chen | 408/56 |
| 8,016,522 B2 | * | 9/2011 | Chen | 408/56 |

FOREIGN PATENT DOCUMENTS

| | | | | |
|---|---|---|---|---|
| GB | 2435439 A | * | 8/2007 | |
| GB | 2450529 A | * | 12/2008 | |
| GB | 2472453 A | * | 2/2011 | |
| JP | 2006102868 A | * | 4/2006 | |
| JP | 2009241234 A | * | 10/2009 | |
| WO | WO 2007017681 A2 | * | 2/2007 | |

\* cited by examiner

Primary Examiner — Eric A Gates
(74) Attorney, Agent, or Firm — Ostrolenk Faber LLP

(57) ABSTRACT

A drill guide, of the type that has a main body with a flat base and an aperture for assisting the movement of a drill bit, interchangeable drilling heads for guiding drill bits of different diameters, the heads designed to be optionally attached and fit onto the housing defined according to the size of through hole of the main body that has the aforementioned interchangeable drilling heads and inside apertures of different diameters on each drilling head, the apertures are specifically designed to guide drill bits of different diameters, a positioning device for attaching the drilling head in use in a set position inside the housing, and a retaining device for retaining any of the interchangeable drilling heads inside the housing.

12 Claims, 4 Drawing Sheets

DRILL GUIDE

PURPOSE OF THE INVENTION

The invention consists of a drill guide, more specifically a drill guide for use with manual or portable drills in the perforation of hard materials.

BACKGROUND OF THE INVENTION

The use of drill guides is common for making holes with a portable or hand drill. If a drill guide, or other means such as a drill column, is not used for guiding the movement of the drill in the perforation, holes are uneven and, therefore, this usually results in a variation in gradient with respect to the vertical needed on the surface to be perforated.

Furthermore, by using the drill guide one ensures that the drill bit does not move from the initial point of perforation until one starts drilling.

The drill guide consists of a flat template of a certain thickness, on which there is a series of through holes corresponding to the diameters of the drill bits that may be used. On placing the drill guide on the surface to be perforated, each through hole provides a guide-route for the tip of the drill bit that is almost perpendicular to the surface to be perforated, thus improving the quality of the hole made.

The drill guide also has a feature whereby the template may be used with a manipulation handle to firmly support it. In both cases, the guide has a hole for every possible drill bit diameter that may be used. The guide is therefore large, bulky and heavy if only one of the guide holes is to be used.

In certain situations, the drill bit must be cooled when the material of the object to be perforated is very hard and is difficult to drill. In such situations, the drill bit heats up through friction and it is advisable to cool it down in order to avoid the high temperatures that reduce the performance of the tool. This operation is carried out by directly applying fluid, such as compressed air or water, onto the drill bit and the hole. The use of water is very effective, but dirty and awkward if the amount of water supplied is not controlled. Furthermore, the drill guide must be detached and the water applied directly. Otherwise the drill bit must be removed and cooled down separately. In either case, the process is inconvenient and hinders attaining a good quality finish of the hole to be drilled.

DESCRIPTION OF THE INVENTION

The drill guide, which is the object of this invention, has a number of special technical features that have been designed to facilitate the correct placement of drill bits, the purpose of which is to obtain holes that are as perpendicular possible as to the surface of the object to be perforated. It likewise cools drill bits down when hard or high-friction materials are perforated, thus avoiding damage to the drill bit used and ensuring that the hole obtained is of a high quality as high temperatures from friction are avoided.

According to the invention's specifications, the drill guide is made up of the following:

A number of interchangeable drilling heads for guiding drill bits of different diameters. The heads are designed so that they may be optionally coupled and fit tightly on the housing that corresponds to the through hole of the body of the object to be perforated. The abovementioned interchangeable drilling heads have inner holes of different diameters in each drilling head. They are specifically designed to guide drill bits of different diameters.

The means for exactly positioning the attachment of the interchangeable drilling head in use inside the housing.

The means for the retention of any one of the interchangeable drilling heads inside the housing.

This configuration enables the drill bit to be correctly positioned according to its diameter. This is achieved through the easy exchange of the drilling head for another that has a through hole of the diameter corresponding to the drill bit to be used. Adjusting the guide to the size of the correct drill bit is very straightforward. The process simply consists in extracting the drilling head in use and changing it for a drilling head with a through hole that fits the diameter of the new drill bit. Furthermore, this configuration enables the size and weight of the guide to be reduced, which makes it more manageable.

The means for retaining the drilling head in use inside the housing of the body of the object to be drilled is comprised of a retention plate that attaches onto the lower surface of the base, which has a cross-section window that is smaller than the lowest point of the interchangeable drilling heads and greater than the inside hole of the interchangeable drilling heads. This retention plate is what actually makes contact beneath the guide with the surface of the object to be perforated.

The means for positioning the attachment of the drilling head in use in a set position inside the housing is comprised of a lateral wing that is determined by the lowest point of the interchangeable drilling heads and is designed to be attached to the main body of the object to be drilled. This stops the drilling head from turning inside the housing.

According to the invention's specifications, the main body has seating for the coupling of a water tank, which supplies water to the aperture of the interchangeable drilling head in use through lateral windows. These lateral windows face each other and are defined in both the housing and in the drilling heads.

Thus, the correct position of the drilling head in respect to the main body is ensured. Furthermore, the unrestricted flow of water is ensured from the windows of the housing and from the through holes.

The tank has a tap to regulate the water supply to the aperture of the drill guide's drilling head and a water outlet opposite the housing's lateral window.

When in use, the water tank is arranged in a slanting position with respect to the housing. Thus, the force of gravity facilitates the supply of water at all times, whether the drill guide is used a horizontal or vertical position.

The lateral water outlet cross-section window of the interchangeable drilling head has an enlarged lateral opening for the accumulation of water in the area adjacent to the aperture of the drilling head in use.

DESCRIPTION OF THE FIGURES

In order to facilitate the understanding of the characteristics of the invention described in this report, a set of drawings has been attached that partially illustrate the way in which it works. The following figures have been included.

PREFERENTIAL USAGE OF THE INVENTION

Figure 1:
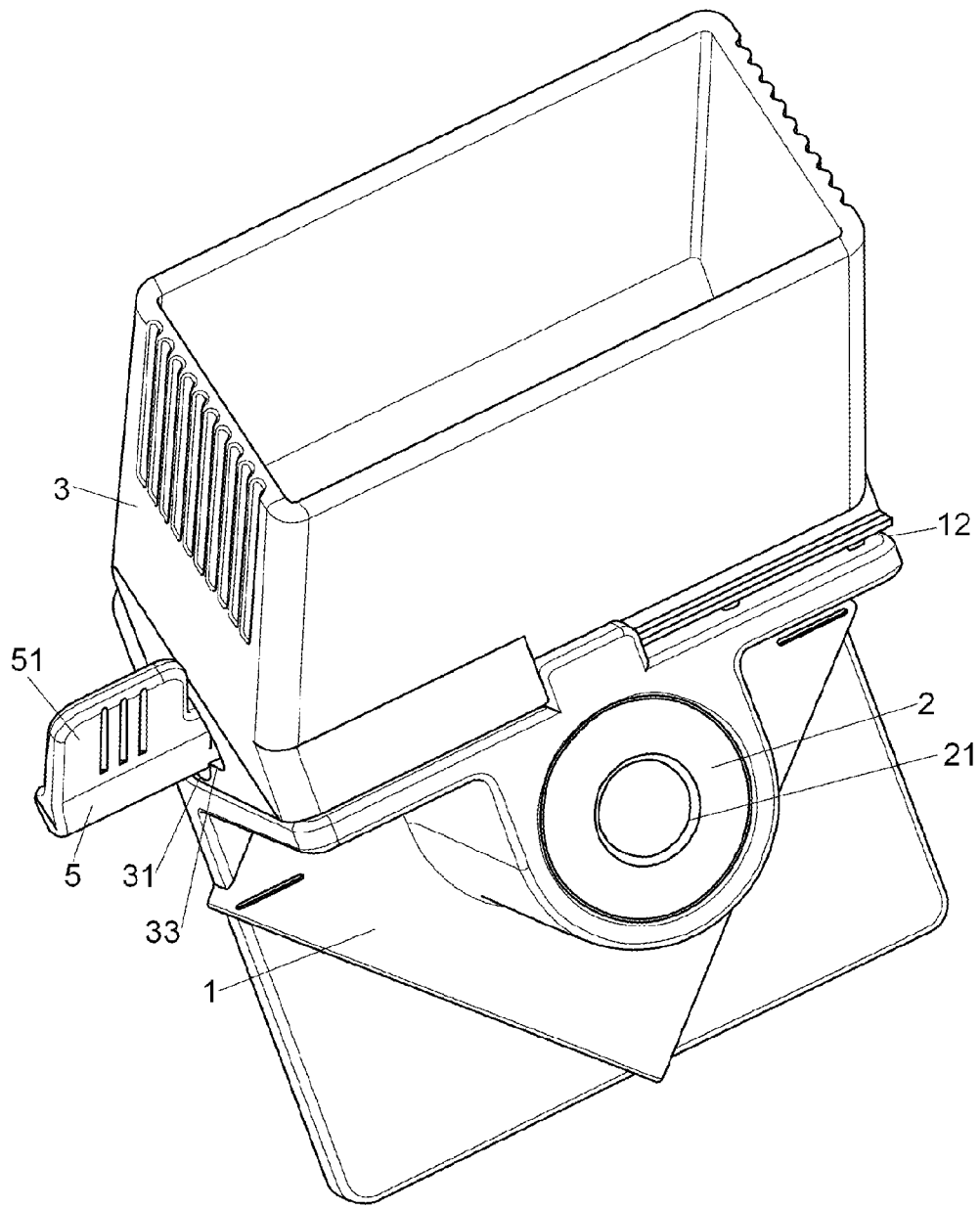
FIG. 1 shows a view in perspective of the drill guide, with one of the interchangeable drilling heads mounted in its position in use.
Figure 2:
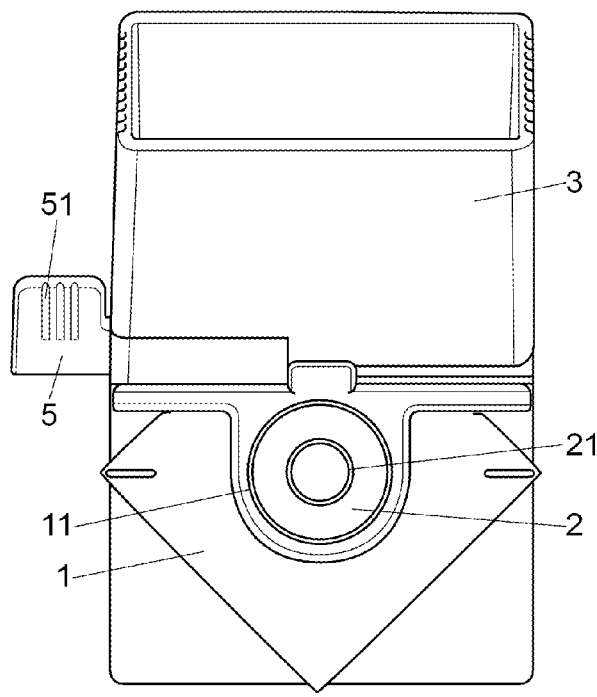
FIG. 2 shows a top plan of the drill guide of the previous figure.

As can be observed in the figures attached, the guide has a main body (1) that features a housing (11) to assist the individual mounting of a number of interchangeable drilling heads (2). They have an aperture (21) of a different diameter for each drilling head in order to guide drill bits of specific diameters.

The interchangeable drilling heads (2) are correctly shaped, in this case they are almost cylindrical, so that they can be properly fitted inside the housing (11). At the bottom of the drilling heads (2) there is a lateral wing (22) that determines the angle of the assembly position in the main body (1).

The main body (1) is lateral to the housing (11) seating (12) for coupling a water tank (3) and its held in place is by teeth (14).

Figure 3:
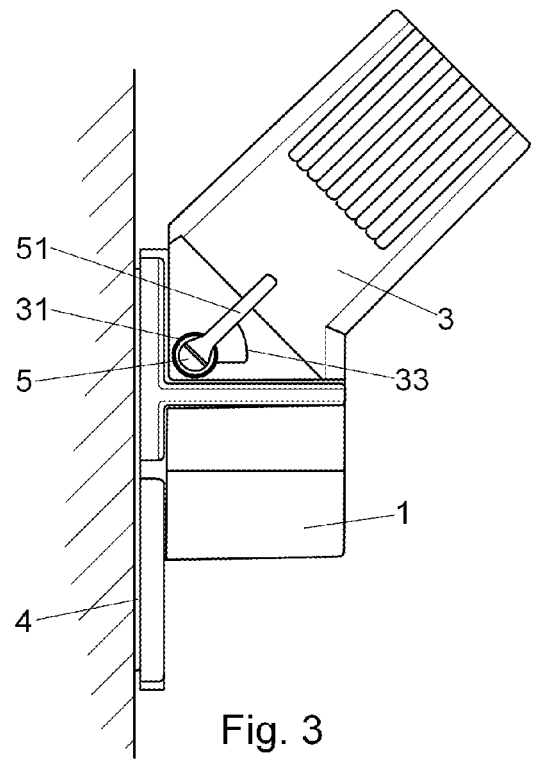
FIG. 3 shows a profile view of the drill guide supported on a vertical surface and with the water tank facing towards the upper area.
Figure 4:
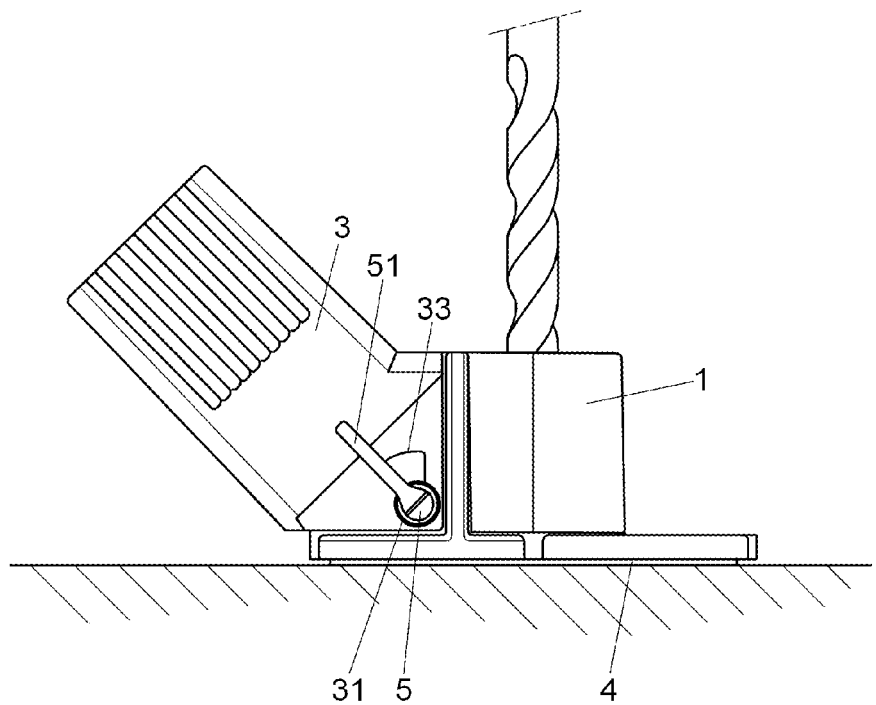
FIG. 4 shows a profile view of the guide for the previous figures on a horizontal surface, during the guiding of a drill bit.
Figure 5:
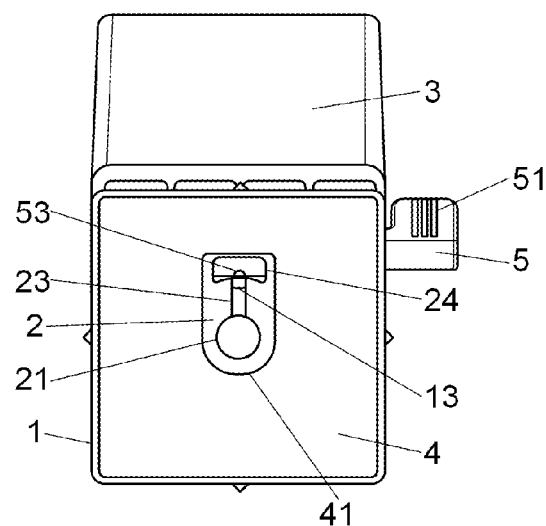
FIG. 5 shows a view of the bottom plan of the guide for the previous figures.
Figure 6:
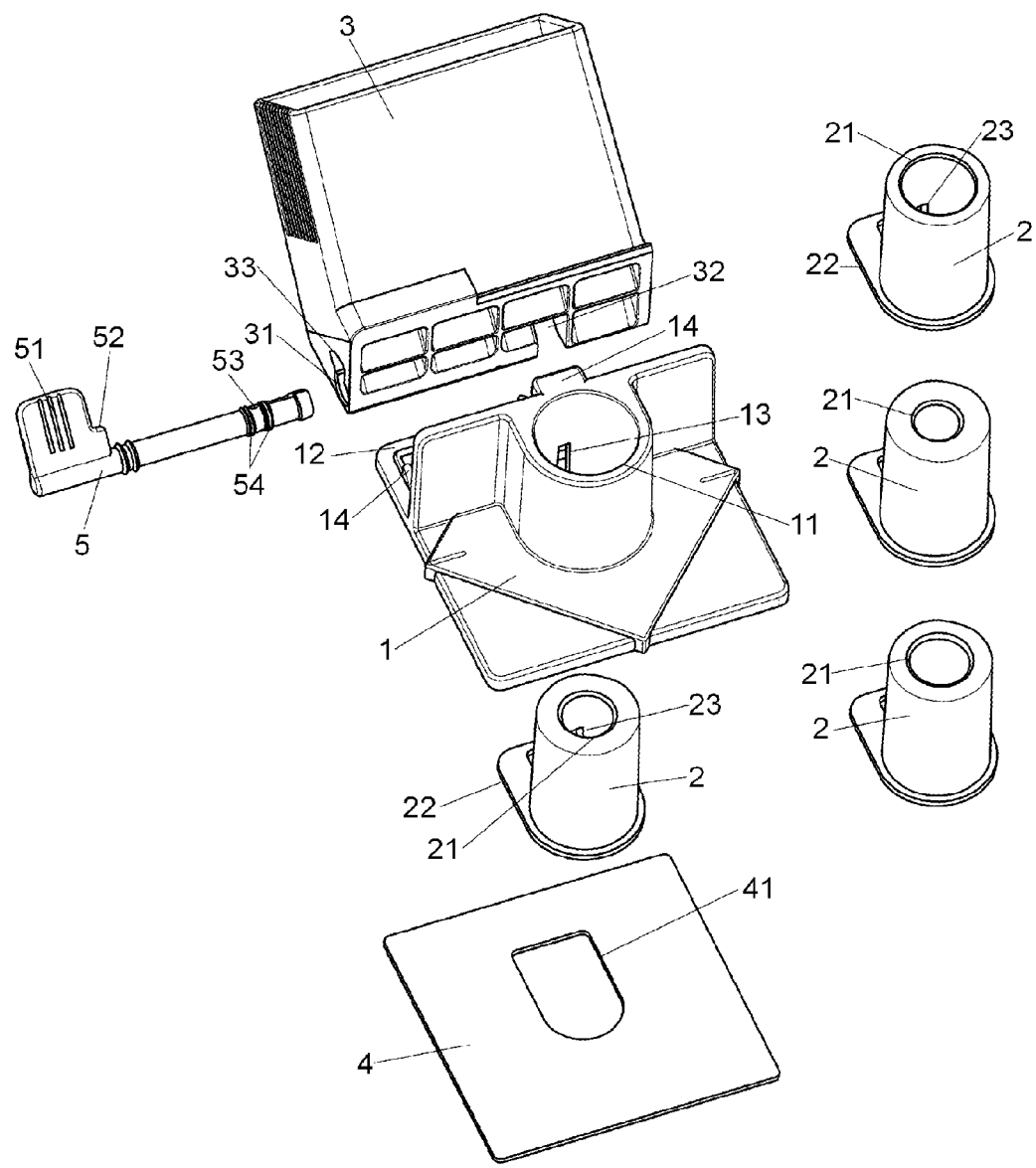
FIG. 6 shows a blown up view in perspective of the drill guide, in which several interchangeable drilling heads are shown, with through holes of different diameters.

The aforementioned tank is placed in a slanting position, which allows the water to be held inside it, regardless of whether main body (1) is used in a vertical or horizontal position, as shown in FIGS. 3 and 4, respectively. In either case, the force of gravity ensures that water is supplied to the inside of (21) the through hole for the drill bit defined in the drilling head (2) in use.

In order to allow the flow of water from the tank to the aforementioned hole (21), the main body (1) and the drilling heads (2) feature lateral cross-section windows (11 and 23) that face each other and have a water outlet (32) that connects to the cavity (31) inside the tank.

The aforementioned cross-section window (23) has a large side opening (24) for the accumulation of water that is adjacent to the (21) through hole of the drill bit.

In order to control the water supply to meet the requirements of every case, the tank (3) has a tap (5). It has a housed tubular body that can be turned in the tubular housing (31) of the tank (3). It is equipped with a wing (51) on one end for its operation and a flap (52) to limit its rotation. It is housed in a rabbet (33) that acts as an outlet through the tank's tubular cavity (31). On one end of the tubular body of the tap (5) there is a transversal aperture (53), located between two joints for watertightness (54). It limits the outflow of water from the tank (3) according to the angle at which the tap (5) is positioned.

This drill guide has a flat, extractable retention plate (4), which can be coupled to the base of the main body and which has the means for retaining any one of the interchangeable drilling heads (2) inside the housing (11).

The flat retention plate (4) features a cross-section window (41) corresponding to the outlet of the through hole (21) for the drill bit. One side is enlarged to the same size as side opening (24) for the accumulation of water, thus providing a way for water to reach the surface of the object to be perforated.

The nature of the invention having being described in detail, as has an example of its preferential use, it is hereby stated that the materials, shape, size and layout of the components described can be modified, providing that this does not result in an alteration to the essential characteristics of the invention, as set out below.

The invention claimed is:

1. A drill guide, comprising,
    a main body with a flat base and a through aperture, for assisting the movement of a drill bit,
    a housing defined by said main body and having a tubular inner wall defining a through hole in correspondence with said through aperture,
    detachable and physically interchangeable drilling heads for guiding drill bits of different diameters, the heads designed to be optionally attached and fit into said tubular inner wall of said housing, and having respective inside through apertures of different diameters on each drilling head, one per drilling head, where the inside through apertures are specifically designed to guide drill bits of different diameters, the through aperture of the attached drilling head being in communication with the through aperture of the main body to allow the drill bit pass there through;
    a positioning device for attaching the drilling head in use in a set position inside the housing; and
    a retaining device for retaining any of the interchangeable drilling heads inside the housing;
    wherein the main body has seating for coupling a water tank to supply water to the aperture of the interchangeable drilling head in use through lateral windows, the lateral windows face each other and are defined in both the housing and in the drilling heads.

2. The guide, according to claim 1, wherein the retaining device for the drilling head in use, inside the housing of the main body, is comprised of a retention plate attachable to the lower surface of the base and which has a window of a smaller cross-section than a lowest point of the drilling heads and greater than the inside aperture of the drilling heads.

3. The guide, according to claim 2, wherein a lateral water outlet window of the interchangeable drilling head has a widened side portion for the accumulation of water in the area adjacent to the aperture of the drilling head in use.

4. The guide, according to claim 1, wherein the positioning device for the attachment of the interchangeable drilling head is in use in a set position inside the housing and is comprised of a lateral wing located at a lowest point of the drilling heads and designed to be attached to the main body, and operable for stopping the drilling head from turning inside the housing.

5. The guide, according to claim 4, wherein a lateral water outlet window of the interchangeable drilling head has a widened side portion for the accumulation of water in the area adjacent to the aperture of the drilling head in use.

6. The guide, according to claim 1, wherein the tank has a tap for the supply of water and a water outlet opposite lateral window of the housing.

7. The guide, according to claim 6, wherein the water tank is in a slanting position in respect to the housing, whereby the force of gravity facilitates the supply of water at all times, whether the drill guide is used a horizontal or vertical position.

8. The guide, according to claim 7, wherein the lateral water outlet window of the interchangeable drilling head has a widened side portion for the accumulation of water in the area adjacent to the aperture of the drilling head in use.

9. The guide, according to claim 6, wherein the lateral water outlet window of the interchangeable drilling head has a widened side portion for the accumulation of water in the area adjacent to the aperture of the drilling head in use.

10. The guide, according to claim 1, wherein the water tank is in a slanting position in respect to the housing, whereby the force of gravity facilitates the supply of water at all times, whether the drill guide is used a horizontal or vertical position.

11. The guide, according to claim 10, wherein the lateral water outlet window of the interchangeable drilling head has a widened side portion for the accumulation of water in the area adjacent to the aperture of the drilling head in use.

12. The guide, according to claim 5, wherein the lateral water outlet window of the interchangeable drilling head has a widened side portion for the accumulation of water in the area adjacent to the aperture of the drilling head in use.

* * * * *